June 25, 1968  R. W. TERSCH  3,389,476
GATE DEVICE FOR GEARS
Filed Oct. 18, 1965
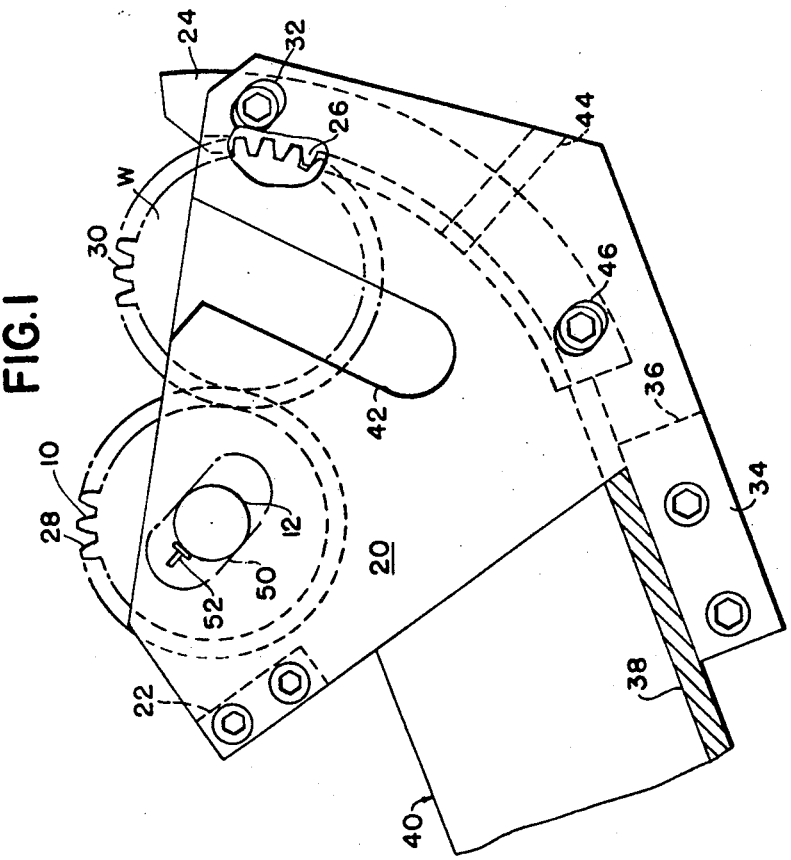
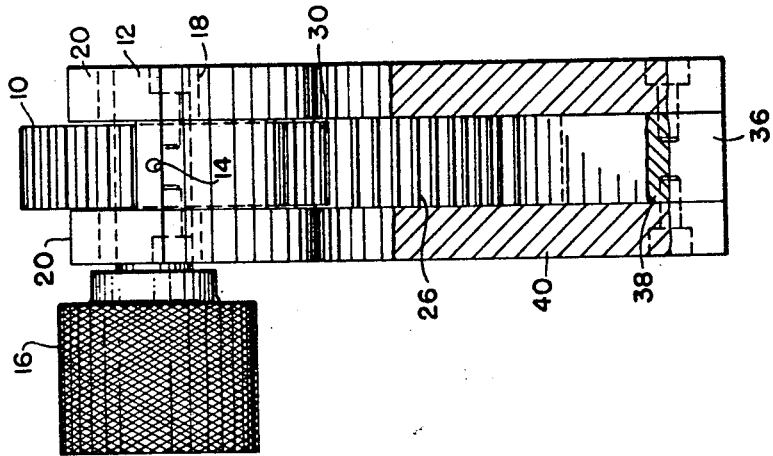
INVENTOR.
RICHARD W. TERSCH
BY Whittemore,
Hulbert & Belknap
ATTORNEYS

United States Patent Office 3,389,476
Patented June 25, 1968

3,389,476
GATE DEVICE FOR GEARS
Richard W. Tersch, Grosse Pointe Woods, Mich., assignor, by mesne assignments, to Lear Siegler, Inc., Santa Monica, Calif., a corporation of Delaware
Filed Oct. 18, 1965, Ser. No. 497,041
9 Claims. (Cl. 33—179.5)

The present invention relates to a gate device for gears intended to prevent entry of an oversized or faultily machined gear into equipment such for example as gear gauging equipment or gear finishing equipment.

It is an object of the present invention to provide a gate device which facilitates removal of an oversized gear which may have been detected by the gate device.

It is a further object of the present invention to provide a gate device capable of checking the complete periphery of the gear and which at the same time occupies a reasonable amount of space.

It is a feature of the present invention to provide a gate device of the type described comprising a rotatable gear, an arcuate rack having its axis coincident with the axis of the rotatable gear and spaced therefrom a distance to provide for full meshing of both the rotatable gear and rack section with the teeth of a work gear.

Other objects and features of the invention will become apparent as the description proceeds, especially when taken in conjunction with the accompanying drawing, illustrating a preferred embodiment of the invention, wherein:

FIGURE 1 is a side elevation, partly in section, of a gate device.

FIGURE 2 is a side elevation of the gate as viewed from the left in FIGURE 1.

The gear gate comprises a rotatable gear 10 conjugate to the work gear W (the gear to be tested) and connected to a shaft 12 by means such as a pin 14, the shaft having an operating knob 16 connected thereto. The shaft 12 is mounted in bearings 18 received in suitable openings in side plates 20. At the upper end the side plates 20 are interconnected by a transverse block 22. At the lower end of the plates 20 there is provided an arcuate rack section 24 having teeth 26 which are also conjugate to the teeth 30 of the work gear W. The rack section 24 is interposed between the side plates 20 and is connected thereto by suitable means such as screws 32 in a position substantially concentric with gear 10. The side plates 20 include laterally extending ears 34 between which is secured a block 36 which provides proper spacing of the plates 20 and also provides support for the floor plate 38 of a chute 40. The chute 40 is arranged to have the upper surface of its floor plate 38 substantially tangent to the arcuate surface occupied by the crests of the teeth 30 of the work gear W as the work gear rolls off the delivery end of the rack 24.

The side plates 20 are both provided with open-ended openings 42 so that the operator may obtain a firm grip on a work gear W if it becomes wedged between the rotatable gear 28 and the rack 24 during any part of its passage through the space therebetween. It will of course be apparent that such wedging may take place if the work gear W is not properly formed, such for example as being oversize, out of round, teeth not hobbed through, heavy tooth due to damaged cutter, teeth not cut around entire periphery, off helix, having lead variation, and the like. Normally of course, the gear is advanced through the space by rotation of the rotatable gear which is rotatable by the operator through the knob 16. With the parts in the relationship illustrated in FIGURE 1 it will of course be readily apparent that clockwise rotation of the rotatable gear 28 will cause counterclockwise rotation of the work gear W, which in turn will cause it to roll downwardly and to the left across the rack 24. Normally, if the gear 40 becomes wedged because of a malformed condition it may be returned to the entry side of the gate by reverse rotation of the knob 16. However, if wedging has occurred it is possible to withdraw the work gear directly.

The dimension of the rotatable gear 28 and the angular extent of the arcuate rack section 24 are so proportioned that a work gear in moving through the space between the rotatable gear and the rack, will have slightly more than 180 degrees of its peripheral extent in full mesh with the rotatable gear and the arcuate rack, thus providing a complete check of the 360 degrees' circumference of the work gear.

The arcuate rack 24 has been described as substantially concentric with the rotatable gear 10. However, it is desirable to provide limited adjustment between the rotatable gear 10 and the arcuate rack 24 in a direction radial of the gear so as to vary the tolerance or amount of excess stock which may be present on a work gear W permitted to pass between the rotatable gear 10 and the rack 24. Suitable means for this purpose may comprise a key and slot guideway 44 and the openings in the side plates 20 and 40 through which the clamping screws 32 pass may be slightly elongated in a direction parallel to the length of the guideway 44, as indicated at 46.

While the invention has so far been described as a gate for preventing entry of an oversized or incompletely or faultily machined gear into a machine, it will of course be apparent that the same construction may be used in making a gear checker capable of determining the size, ovality or other defects of work gears. In such case, the gear 28 may be in the form of an accurately finished master gear and the rack 24 correspondingly accurately finished. The gear 28 is then mounted for movement toward and away from the arcuate rack as for example, by mounting the shaft 12 in the elongated slots diagrammatically illustrated in dot and dash lines at 50. Resilient means (not shown) may be provided to urge the gear 28 toward the rack so as to insure tight meshing between the teeth of the gears and rack. The position of the shaft 12 during passage of the work gear W through the device may be determined by suitable gauge means such for example as a gauge having an operating plunger 52 engaged by the shaft 12.

The drawing and the foregoing specification constitute a description of the improved gate device for gears in such full, clear, concise and exact terms as to enable any person skilled in the art to practice the invention, the scope of which is indicated by the appended claims.

What I claim as my invention is:

1. A device of the character described for checking gears or for preventing entry of oversized or faulty gears into a gear finishing machine or gear checker or the like comprising a rotatable gear, a circularly arcuate rack section substantially concentric with said rotatable gear and spaced therefrom a distance to permit passage of a work gear in mesh simultaneously with said rotatable gear and rack, the angular extent of said rack being at least equal to one half the circumference of said work gear such that each tooth of the work gear meshes with teeth either on said rotatable gear or arcuate rack.

2. A device as defined in claim 1 having side plates extending between said rotatable gear and arcuate rack.

3. A device as defined in claim 2, said side plates having elongated slots extending from the entry side of said device to provide for grasping opposite sides of a jammed work gear for removing it from the device.

4. A device as defined in claim 1, said rotatable gear having means for rotating it to advance a work gear through the device.

5. A device as defined in claim 1, the diameter of the rotatable gear and the angular extent of the rack being proportioned such that each makes meshing engagement with slightly over 180 degrees of angular extent of a work gear.

6. A device as defined in claim 1 which operates as a gate to prevent passage of an oversized or faultily machined gear therethrough in which the location of the arcuate rack and of the rotatable gear is fixed in use.

7. A device as defined in claim 1 which operates as a gate to prevent passage of an oversized or faultily machined gear therethrough in which the rack and rotatable gear are relatively adjustable as to radial spacing.

8. A device as defined in claim 7 in which said rack is mounted for adjustment radially of said rotatable gear, and means for clamping said rack in adjusted position.

9. A device as defined in claim 1 which is used for checking size and ovality of work gears in which the rotatable gear and the rack are relatively movable toward and away from each other, and means responsive to relative movement between said members to determine the size and/or ovality of work gears.

References Cited
UNITED STATES PATENTS 2,854,760   8/1958   Cheever _____ 33—179.52

SAMUEL S. MATTHEWS, *Primary Examiner.*